United States Patent
Irniger

(10) Patent No.: US 12,453,679 B2
(45) Date of Patent: Oct. 28, 2025

(54) METHOD FOR THE PREPARATION OF A BASE FORMULATION FOR A DERMATOLOGICAL SUNSCREEN COMPOSITION AND FOR THE PREPARATION OF A DERMATOLOGICAL SUNSCREEN COMPOSITION

(71) Applicant: ULTRASUN AG, Zürich (CH)

(72) Inventor: Benedikt Irniger, Zürich (CH)

(73) Assignee: ULTRASUN AG, Zurich (CH)

( * ) Notice: Subject to any disclaimer, the term of this patent is extended or adjusted under 35 U.S.C. 154(b) by 0 days.

(21) Appl. No.: 17/041,064

(22) PCT Filed: Mar. 29, 2019

(86) PCT No.: PCT/IB2019/052635
§ 371 (c)(1),
(2) Date: Sep. 24, 2020

(87) PCT Pub. No.: WO2019/186509
PCT Pub. Date: Oct. 3, 2019

(65) Prior Publication Data
US 2021/0093519 A1    Apr. 1, 2021

(30) Foreign Application Priority Data
Mar. 29, 2018  (DE) .......................... 102018107718.1

(51) Int. Cl.
| | | |
|---|---|---|
| *A61K 8/02* | (2006.01) | |
| *A61K 8/29* | (2006.01) | |
| *A61K 8/31* | (2006.01) | |
| *A61K 8/34* | (2006.01) | |
| *A61K 8/37* | (2006.01) | |
| *A61K 8/49* | (2006.01) | |
| *A61K 8/55* | (2006.01) | |
| *A61Q 17/04* | (2006.01) | |

(52) U.S. Cl.
CPC .............. *A61K 8/0295* (2013.01); *A61K 8/29* (2013.01); *A61K 8/31* (2013.01); *A61K 8/345* (2013.01); *A61K 8/37* (2013.01); *A61K 8/375* (2013.01); *A61K 8/4966* (2013.01); *A61K 8/553* (2013.01); *A61Q 17/04* (2013.01)

(58) Field of Classification Search
CPC . A61K 8/31; A61K 8/375; A61K 8/29; A61K 8/0295; A61K 8/4966; A61K 8/345; A61K 8/553; A61K 8/37; A61Q 17/04
See application file for complete search history.

(56) References Cited

U.S. PATENT DOCUMENTS

| | | | |
|---|---|---|---|
| 5,547,658 A | 8/1996 | Hansenne et al. | |
| 2002/0048597 A1* | 4/2002 | Kropke | A61K 8/736 424/450 |
| 2002/0065328 A1* | 5/2002 | Dederen | C09K 23/017 516/9 |
| 2002/0172710 A1* | 11/2002 | Twine | A61K 9/127 424/450 |
| 2003/0118527 A1* | 6/2003 | Jager | A61K 8/39 424/59 |
| 2007/0031353 A1* | 2/2007 | Wallquist | A61Q 19/00 424/59 |
| 2008/0112909 A1* | 5/2008 | Faler | A61Q 11/00 424/61 |
| 2009/0258065 A1* | 10/2009 | Baudonnet | A61P 17/08 424/452 |
| 2010/0189662 A1* | 7/2010 | Neubourg | A61Q 17/04 424/47 |
| 2016/0081895 A1* | 3/2016 | Elliott | A61K 8/345 424/60 |
| 2018/0185252 A1* | 7/2018 | Zhang | A61K 8/44 |

FOREIGN PATENT DOCUMENTS

DE   102009008940 A1 *  8/2010

OTHER PUBLICATIONS

Yeagle: Structures of Lipid Assemblies, https://www.sciencedirect.com/topics/agricultural-and-biological-sciences/lamellar-phase (Year: 2016).*
Yang et al., 'The role of cholesterol in membrane fusion', Chemistry and Physics of Lipids, V.199, Sep. 2016, pp. 136-143 (2016).
Laili et al., 'Molecular arrangement of lamellar liquid crystalline structure with virgin coconut oil', Asian Journal of Chemistry, vol. 29, No. 10, pp. 2129-2132 (2017).

* cited by examiner

*Primary Examiner* — Hong Yu
(74) *Attorney, Agent, or Firm* — CanaanLaw, P.C.; Karen Canaan; David B. Ritchie

(57) ABSTRACT

A process for preparing a base formulation for a dermatological sunscreen composition comprising base formulations comprising oil and water phases and containing a plurality of UV-absorbing substances and at least one amphiphilic substance which forms lamellar structures.

9 Claims, No Drawings

METHOD FOR THE PREPARATION OF A BASE FORMULATION FOR A DERMATOLOGICAL SUNSCREEN COMPOSITION AND FOR THE PREPARATION OF A DERMATOLOGICAL SUNSCREEN COMPOSITION

CROSS-REFERENCE TO RELATED PATENT APPLICATIONS

This application is a U.S. National Stage Application under 35 U.S.C. § 371 of International Patent Application No. PCT/IB2019/052635, filed Mar. 29, 2019, which claims the benefit of priority of German Patent Application No. DE 102018107718.1 filed Mar. 29, 2018, both of which are incorporated by reference in their entireties. The International Application was published on Oct. 3, 2019, as International Publication No. WO 2019186509.

The present invention concerns a process for the preparation of a base formulation for a dermatological sunscreen preparation and a process for the preparation of a dermatological sunscreen preparation.

Various dermatological light protection preparations and their manufacturing processes are known from the state of the art.

Light protection preparations in general are intended to protect the skin from too much UV radiation. Sun protection preparations in the form of suntan lotion are the most common. Sun milk is a liquid emulsion, which consists of a oil portion and a water portion. Light protection preparations are also available in the form of cream, oil or water-based gel. Light protection preparations with a low water content are ointment-like, those with a high water content more like a lotion.

The usual dermatological sun protection preparations are usually based on a mixture of known and proven combinations of active ingredients and auxiliary substances. According to current knowledge, not all of these active ingredients and excipients are still desired in cosmetics and skin care products from a medical point of view and, in particular, from the consumer's point of view. For many of these substances, their mode of action as a single substance or as a mixture of substances, their absorption in the body, their rate of release, the place of release and the place of action are often uncertain. Although this may be tolerated in cosmetics with intact skin because of their high barrier and repair performance, it can reverse the intended positive effect of the preparation into its opposite, especially in sensitive or damaged skin.

Restrictive regulations on permissible active ingredients and additives can be found in the European Regulation (EC) No 1223/2009 on cosmetic products.

In light protection preparations, chemical and physical filter substances are usually used as active ingredients to block UV radiation.

Chemical filters, for example in a preparation as described in DE 693 189 12 T2, are indeed extremely efficient, since their effect can last particularly long due to the absorption behaviour of the skin. However, they are suspected of possibly triggering allergic reactions or cell damage.

Physical filters consist of very finely ground minerals, preferably metal oxides such as titanium dioxide, zinc oxide or aluminium oxide, and the filtering effect is purely physical in nature through scattering, reflection and partial absorption with accompanying energy conversion of the UV light. Their advantage is that they are chemically inert and therefore neither decompose nor cause allergic side effects (with the exception of aluminium oxide, which is why this is excluded in the sense of the invention). A disadvantage, however, is that the protective layer from the applied light protection preparation can easily be rinsed off with water or sweat. Unwantedly and mostly unnoticed it can come to a skin damage by UV light, which is why the skin has to be creamed more often to the disadvantage of the user.

For the reasons mentioned above, it is desirable that light protection preparations contain predominantly physical filters and offer long-lasting protection as well as being waterproof in order to increase the application comfort and skin compatibility of light protection preparations. Furthermore, light protection preparations should be produced efficiently and economically.

It would therefore be desirable to have an easy-to-handle manufacturing process for a dermatological sun protection preparation in which the proportion of undesirable substances in relation to the harmless auxiliary and active substances is significantly reduced, if not completely excluded, in order to minimise undesirable effects.

Preparations based on lamellar layer systems, preferably so-called "hydrogenated liposomes", have proven to be particularly promising sun protection preparations. Such lamellar coating systems and their manufacturing processes are disclosed for example for cosmetic facial and lip care in DE 10 2006 045 388 A1 or also in DE 10 2006 045 389 A1, However, known manufacturing processes have not proved to be optimally practicable. Light protection preparations produced in this way with a liposomal phase and integrated chemical and physical filters, in particular those described in DE 10 2006 045 388 A1, are not stable and phase separation occurs. The manufacturing process is also very complex, not easily scalable and therefore not efficient and easy to handle.

It is therefore the task of the invention to provide a process for the production of an initial formulation for a dermatological sun protection preparation which overcomes the aforementioned disadvantages from the state of the art.

In the sense of the invention, the base formulation is a base formulation comprising an oil phase and a water phase and containing at least one UV-absorbing substance and at least one amphiphilic substance forming lamellar structures, preferably a system of lamellar structures. Lamellar structures form systems which are characterized by a regular, layer-like structure. In the human body, such structures are found as lipid bilayers in the cell membranes.

Topical lamellar systems are usually based on natural models and use phosphatidylcholine, ceramides, sterols and fatty acids as structure-forming elements.

In the sense of the invention, however, lamellar systems can also be formed by many synthetic surfactants if they are present in sufficiently high concentrations and if these amphiphilic substances permit a double layer arrangement due to their molecular structure, i.e. a balanced ratio of hydrophilic and lipophilic molecule parts.

However, the formation of lamellar structures of hydrogenated lipids is not spontaneous, but requires a high energy input in the form of temperature and possibly mechanical energy (e.g. homogenization under pressure and/or stirring) during production, especially during barrier constitution.

In the sense of the invention one produces for the production of an initial formulation for a dermatological sun protection preparation:
  an oil phase comprising at least one emollient, preferably a triglyceride, and the essential content of UV-absorbing substances, and heats and homogenizes this oil phase in a first step to at least 80° C., preferably at least 90° C., preferably up to a maximum of 96° C.; and in a second step adds at least one UV-absorbing inorganic substance at at least 70° C., preferably at least 75° C., preferably up to a maximum of 82° C.;

a water phase comprising the substantial content of amphiphilic substance and heating and homogenizing said water phase to at least 70° C., preferably at least 80° C., preferably up to a maximum of 86° C.;

combines both phases, optionally with the addition of at least one further UV-absorbing substance, and homogenizes the combined product.

In preferred processes, instead of the previously described oil phase, an oil phase comprising at least one emollient, preferably a triglyceride, is produced and this oil phase is heated and homogenized in the first step to at least 80° C., preferably at least 90° C., preferably up to a maximum of 96° C., and at least one UV-absorbing inorganic substance is added in the second step at at least 70° C., preferably at least 75° C., preferably up to a maximum of 82° C., at least one UV-absorbing inorganic substance.

In preferred processes, the base formulation contains an oil phase in a proportion of 30 to 50% by weight, preferably 25 to 40% by weight, or 35 to 45% by weight and a water phase in a proportion of 30 to 40% by weight, preferably 25 to 40% by weight, or 35 to 45% by weight.

In a preferred process according to the invention, the base formulation contains an oil phase and a water phase in a ratio of 1:4 to 4:1, preferably from 1:3 to 3:1 and particularly preferably from 1:2 to 2:1.

In a preferred process in accordance with the invention, the initial formulation contains an oil phase in the majority, preferably nearly, and exclusively for special applications, as well as a small proportion of less than 10% by weight, preferably less than 5% by weight, of a water phase.

In preferred processes, the oil phase contains at least one, preferably two, medium-chain triglycerides selected from esterification products of glycerol with capric acid and caprylic acid in a ratio of 1:3, preferably caprylic triglycerides, and coco triglycerides.

In processes according to the invention, the oil phase contains as UV absorber a hexyl benzoate, preferably a 2-[4-(diethylamino)-2-hydroxybenzoyl]-benzoic acid hexyl ester and/or a bemotrizinol, and/or a cyanuric triamide and/or an ethylhexyl triazone, and/or an ethylhexyl salicylate and/or a preferably coated $TiO_2$.

In the sense of the invention, coated $TiO_2$ is a $TiO_2$ powder whose particles have been coated with a silicate layer. This has the advantage that the UV absorption rate is higher compared to uncoated $TiO_2$ due to the coating and thus a greater protection against UV radiation is given with the same amount of $TiO_2$.

In preferred processes, the oil phase contains a proportion of phytosqualane of 0.5 to 6.5, preferably up to 8.5 or even up to 10.5 percent by weight.

In preferred processes, the oil phase contains an alkyl benzoate content of 3.5 to 9.5, preferably up to 14.5 or even up to 19.5 percent by weight.

In preferred processes, the oil phase contains a proportion, preferably coated, of $TiO_2$ of 6.5 to 15.5, preferably up to 18.5 or even up to 20.5 weight percent as physical filter material. Tests have shown that $TiO_2$, preferably coated, in the form of nanocrystalline powder with an average particle size of less than 30 nm to 25 nm, preferably less than 25 nm to 20 nm, preferably less than 20 nm to 15 nm or less than 15 nm to 10 nm and especially less than 10 nm to 5 nm, is particularly suitable.

In preferred processes, the UV-absorbing substances in the oil phase to the UV-absorbing inorganic substance are in a ratio of at least 1:1, preferably at least 1:2 to 2:1 or also at least 1:1.5 to 1.5:1, particularly preferably at least 1:3 to 3:1, and at most 1:4 to 4:1.

In preferred processes the water phase contains an amphiphilic substance, preferably hydrogenated phosphatidylcholine with 0.5 to 5.5, preferably up to 10.5 or even up to 12.5 weight percent.

Hydrogenated phosphatidylcholine has a particularly suitable fatty acid composition, consisting of saturated $C_{18}$ and $C_{16}$ acids, which determine the planar structure of a double layer.

In preferred processes, native phosphatidylcholine fractionated by column chromatography from soy lecithin with a high linoleic acid content of 80 to 90% by weight in the fatty acid composition is preferably used, which produces cellular double layers. Such double layers, also known as liposomes, increase the penetration of active substances, especially physical filters.

In preferred processes, it is thus possible to adjust the initial formulation with a high degree of transport of active substances and a very low wash-out effect from the skin steplessly by setting a suitable mixing ratio of oil phase and/or water phase and/or the UV-absorbing and/or UV-absorbing inorganic substances and/or amphiphilic substances contained therein.

In the case of processes according to the invention, the water phase contains glycerol and/or glycol, preferably pentylene glycol.

In the case of preferred processes according to the invention, at least one, preferably anionic, mixed polysaccharide shall be added to the water phase.

In the sense of the invention, the addition of at least one gelling agent, preferably the aforementioned polysaccharide or a carbomer, serves to stabilize the lamellar structures or the lamellar system against consistency changes or lysophosphatidylcholine formation (elimination of fatty acid residues by hydrolysis).

In preferred processes, the oil phase is heated in the first step to a maximum temperature of 83° C., preferably 88° C., preferably 92° C. and particularly preferably 97° C., and or in the second step to a maximum temperature of 76° C., preferably 81° C. and particularly preferably 86° C., and/or the water phase is heated to a maximum temperature of 72° C., preferably 75° C. and particularly preferably 78° C., in the first step.

In preferred processes the other UV absorbing substance is a bisoctrizole based UV-A/UV-B absorber.

In a process according to the invention for the preparation of a dermatological sun protection formulation, a second water phase is produced which contains at least one polyalcohol in addition to water;

and mixes the initial formulation according to the invention with the second water phase at a temperature of at least 60° C. and homogenizes the mixture.

Preferably, the at least one polyalcohol of the second water phase comprises a glycerol and/or a glycol, preferably pentylene glycol.

The invention claimed is:

1. A method for the preparation of a base formulation for a dermatological sunscreen composition comprising the steps of:

producing an oil phase by
(i) heating and homogenizing at a temperature in the range of 80° C. to 96° C. a mixture comprising a capryl triglyceride and/or a coco glyceride, 1 to 8.5 weight percent of phytosqualane, 3.5 to 19.5 weight percent of alkyl benzoate, an organic bisoctrizole based UV-A/UV-B absorbing substance, and at least one additional organic UV absorbing substance selected from the group consisting of hexyl benzoate, bemotrizinol, cyanuric triamide, ethylhexyl triazone, ethylhexyl salicylate, and combinations thereof and optionally coated titanium dioxide, and (ii) admixing the heated and homogenized mixture of (i) with coated titanium dioxide at a temperature in the range of 70° C. to 82° C., wherein the coated titanium dioxide of (i) and (ii) is present in the oil phase in a concentration of 6.5 to 20.5 weight percent, the organic UV absorbing substances of (i) to the coated titanium dioxide of (i) and (ii) are in a ratio of at least 1:1, and the oil phase is present in the base formulation in an amount of 30 to 50 weight percent;

producing a first water phase by heating and homogenizing a mixture comprising 0.5 to 12.5 weight percent of hydrogenated phosphatidylcholine, a polyalcohol, and water at a temperature in the range of 70° C. to 86° C., wherein the heating and homogenization of the hydrogenated phosphatidylcholine forms lamellar structures and the water phase is present in the base formulation in an amount of 30 to 40 weight percent;

mixing the oil phase and the first water phase to form a combined product; and homogenizing the combined product to form the base formulation for the dermatological sunscreen composition, wherein the oil phase and the first water phase that comprise the base formulation do not separate and all weight percentages are relative to the total weight of the base formulation.

2. The method of claim 1, wherein the coated titanium dioxide of (i) and (ii) is present in the oil phase in a concentration of 6.5 to 15.5 weight percent.

3. The method of claim 1, wherein the hydrogenated phosphatidylcholine is present in the first water phase in a concentration of 0.5 to 10.5 weight percent.

4. The method of claim 1, wherein the polyalcohol of the first water phase is a glycerol and/or a glycol.

5. The method of claim 4, wherein the glycol is pentylene glycol.

6. The method of claim 1, further comprising:
producing a second water phase comprising water and at least one polyalcohol;
mixing the base formulation with the second water phase at a temperature of at least 60° C. to form a mixture; and
homogenizing the mixture.

7. The method of claim 6, wherein the at least one polyalcohol is a glycerol and/or a glycol.

8. The method of claim 7, wherein the glycol is pentylene glycol.

9. The method of claim 1, wherein the mixture of the first water phase further comprises an anionic polysaccharide that stabilizes the lamellar structures against hydrolysis.

* * * * *